United States Patent Office 3,160,649
Patented Dec. 8, 1964

3,160,649
SYNTHESIS OF METHYLTHIOMETHYL
ISOTHIOCYANATE
Torsten Hasselstrom, Framingham, and Richard C. Clapp, Natick, Mass., assignors to the United States of America as represented by the Secretary of the Army
No Drawing. Filed Feb. 2, 1961, Ser. No. 86,831
2 Claims. (Cl. 260—454)
(Granted under Title 35, U.S. Code (1952), sec. 266)

The invention described herein, if patented, may be manufactured and used by or for the Government for governmental purposes, without the payment to us of any royalty thereon.

This invention concerns methylthiomethyl isothiocyanate, particularly for use as a synthetic condiment.

We have succeeded in synthesizing methylthiomethyl isothiocyanate, in spite of the difficult-to-synthesize nature of methylthiomethyl isothiocyanate as a derivative of formic acid. It is a yellow to colorless liquid, having a pleasantly pungent taste and aroma resembling mustard, with a slight peppery accent. Being a chemical relative of mustard oil (allyl isocyanate), it is non-poisonous to humans and warm-blooded animals.

We now proceed to describe our synthesis of methylthiomethyl isothiocyanate.

A mixture of 11.5 g. (0.12 mol) of dry, powdered potassium thiocyanate, 10 g. (0.10 mol) of chloromethyl methyl sulfide, and 40 ml. of petroleum ether, temperature 35°–75° C., are stirred and refluxed for 6 hours. An additional 11 g. (0.11 mol) of powdered potassium thiocyanate is added during this period. After cooling overnight at 0°–5° C. the yellow oil that had separated as a lower layer, is dissolved by adding methylene chloride. The solid present is filtered off, and the solvent removed from the filtrate under reduced pressure. Distillation of the concentrate at 18 mm. yields 9.88 g. (80% yield) of a light yellow liquid, B.P. 83–86°. Redistillation gives a mildly pungent, colorless liquid; B.P. 82–84° (17 mm.), $n_D^{19}$ 1.5884.

Analysis.—Calcd. for $C_3H_5NS_2$: C, 30.23; H, 4.23; S, 53.79. Found: C, 30.40; H, 4.27; S, 54.16. Structural formula: $CH_3.S.CH_2.N=C=S$.

The infrared spectrum shows the typical strong isothiocyanate band at 4.97μ.

The isothiocyanate structure of the foregoing compound was further proved by conversion to N-(methylthiomethyl)-thiourea, according to the following procedure: A solution of 4 g. of methylthiomethyl isothiocyanate (obtained in accordance with the above-described synthesis) in 100 ml. of ammonia-saturated methanol is allowed to stand at room temperature for 16 hours. After removal of the methanol under reduced pressure, crystallization from hexane-ethyl acetate yields 2.3 g. (50% yield) of white crystals, M.P. 96–101°. Several recrystallizations from hexane-ethyl acetate afford glistening white leaflets of N-(methylthiomethyl)-thiourea, M.P. 102–104. The absorption spectrum in ethanol showed a maximum at 247 mμ.

Analysis.—Calcd. for $C_3H_8N_2S_2$: C, 26.45; H, 5.92; N, 20.57. Found: C, 26.41; H, 5.96; N, 20.50.

Obviously, the conditions of the above synthesis may be suitably varied, e.g., by substituting another mutual inert organic solvent in lieu of petroleum ether, or by substituting another alkali metal thiocyanate (e.g., sodium thiocyanate), or silver thiocyanate, in lieu of potassium thiocyanate.

Methylthiomethyl isothiocyanate may be used as a condiment either by placing a number of drops thereof onto the comestible which is to be flavored, or it may be first diluted with an edible carrier therefor, such as ethyl alcohol.

Accordingly, our method of synthesizing methylthiomethyl isothiocyanate comprises reacting chloromethyl methylsufide and a member of the group consisting of alkali metal thiocyanate and silver thiocyanate in a mutual inert organic solvent at not less than room temperature, cooling the same until two layers form, and recovering liquid methylthiomethyl isothiocyanate from the lower layer.

It will thus be seen that we have synthesized a new compound, methylthiomethyl isothiocyanate suitable for use as a synthetic condiment having a novel flavor and aroma generally resembling mustard with a pleasing peppery accent. Having thus described our invention and its practice, we now define the scope of our invention by the appended claims.

We claim:

1. Method of synthesizing methylthiomethyl isothiocyanate comprising warming a solution of chloromethyl methylsulfide and of a member of the group consisting of alkali metal thiocyanate and silver thiocyanate in a mutual inert organic solvent until said sulfide and said thiocyanate combine, cooling the solution until two layers form, and recovering liquid methylthiomethyl isothiocyanate from the lower layer.

2. Method of synthesizing methylthiomethyl isothiocyanate comprising warming a solution of chloromethyl methylsulfide and of a larger quantity of potassium thiocyanate in a mutual inert organic solvent to not more than about 75° C. for about six hours, cooling said solution to a temperature not exceeding about 5° C. for a time corresponding to about overnight until two layers form, and recovering liquid methylthiomethyl isothiocyanate from the lower layer.

References Cited by the Examiner
UNITED STATES PATENTS

| | | | |
|---|---|---|---|
| 2,753,350 | 7/56 | Hasselstrom | 99—140 X |
| 2,885,428 | 5/59 | Luskin | 260—454 |
| 2,886,584 | 5/59 | McKay et al. | 260—454 |
| 2,955,041 | 10/60 | Broderick et al. | 99—140 |
| 2,957,771 | 10/60 | Prater et al. | 99—140 |

OTHER REFERENCES

Acta Chem. Scand., by Kjaer et al., 11, 1957, pp. 1298–1300, QD 1A 32.

WILLIAM B. KNIGHT, Primary Examiner.

ABRAHAM H. WINKLESTEIN, BEATRICE H. STRIZAK, A. LOUIS MONACELL, Examiners.